United States Patent [19]

Hanna

[11] Patent Number: 4,491,166
[45] Date of Patent: Jan. 1, 1985

[54] PANEL DISPLAY

[75] Inventor: Gary D. Hanna, Don Mills, Canada

[73] Assignee: G. D. Hanna Incorporated, Ontario, Canada

[21] Appl. No.: 441,240

[22] Filed: Nov. 12, 1982

Related U.S. Application Data

[63] Continuation of Ser. No. 238,127, Feb. 25, 1981.

[30] Foreign Application Priority Data

Dec. 31, 1980 [CA] Canada .................................. 367754

[51] Int. Cl.$^3$ .............................................. E06B 3/12
[52] U.S. Cl. .................. 160/351; 160/229 R; 52/586
[58] Field of Search ................... 160/119, 135, 229 R, 160/351; 52/63, 71, 582, 585, 586, 795, 799; 46/21, 26, 30, 31; 40/605

[56] References Cited

U.S. PATENT DOCUMENTS

| | | | |
|---|---|---|---|
| 1,623,641 | 4/1927 | Sihta ........................................ | 46/31 |
| 1,956,323 | 4/1934 | Gregg .................................... | 52/799 |
| 2,406,729 | 8/1946 | White et al. ......................... | 160/119 |
| 2,708,329 | 5/1955 | McKee ................................... | 46/31 |
| 2,909,867 | 10/1959 | Hobson ................................ | 46/29 |
| 3,210,901 | 10/1965 | Meyer .................................... | 52/582 |
| 3,537,200 | 11/1970 | Babb ..................................... | 40/605 |
| 3,563,582 | 2/1971 | Shroyer ................................ | 52/586 |
| 3,803,754 | 4/1974 | Fischer ................................. | 46/26 |
| 3,913,656 | 10/1975 | Guyer . | |
| 4,143,481 | 3/1979 | Loechel ................................ | 46/26 |
| 4,257,207 | 3/1981 | Davis ..................................... | 46/31 |

FOREIGN PATENT DOCUMENTS

| | | |
|---|---|---|
| 1933259 | 6/1969 | Fed. Rep. of Germany . |
| 1208685 | 10/1970 | United Kingdom . |
| 1254904 | 11/1971 | United Kingdom . |

Primary Examiner—Peter M. Caun
Attorney, Agent, or Firm—Burgess, Ryan & Wayne

[57] ABSTRACT

A display panel, connectors and display panel system are disclosed in which the individual panels are provided with peripheral slots or channels which have resilient or frictional walls which grasp connectors and serve to join two adjacent panels. The connectors are provided with slot penetrating ends and are dimensioned to be gripped within the slots.

3 Claims, 18 Drawing Figures

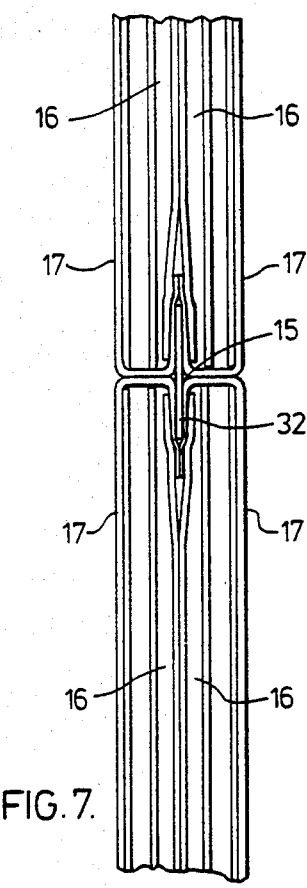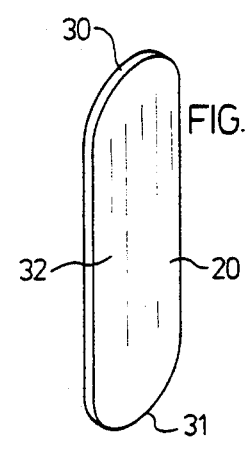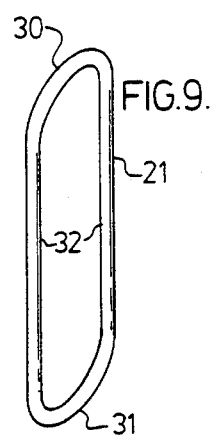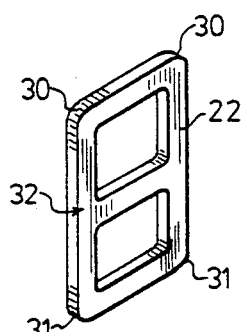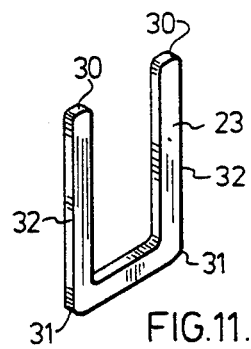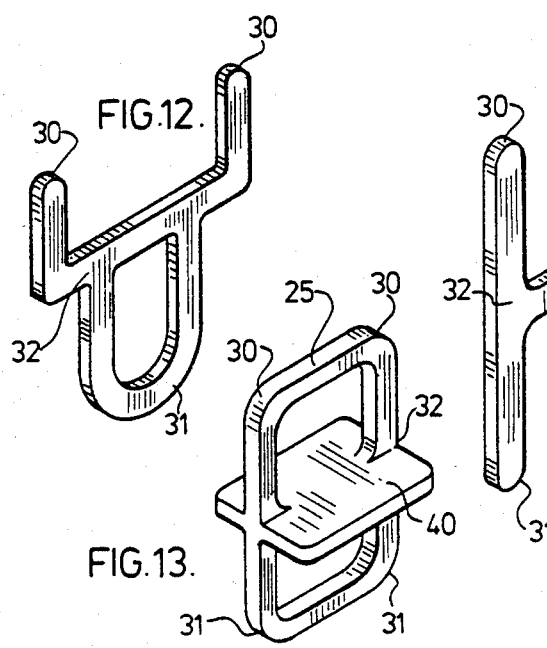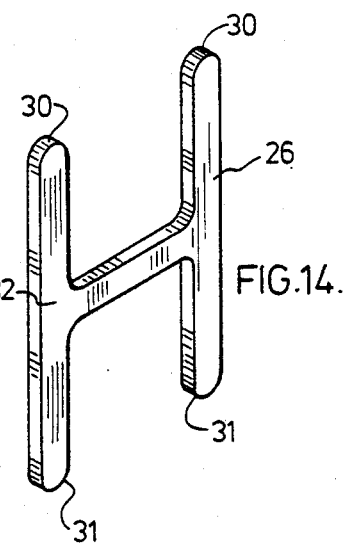

4,491,166

PANEL DISPLAY

This is a continuation of application Ser. No. 238,127, filed Feb. 25, 1981.

BACKGROUND OF THE INVENTION

This invention relates to display structures.

The exhibition industry has developed considerably in recent years and with the advent of more and more international exhibitions, it has been customary for exhibitors to ship complete preassembled exhibits even between continents to ensure the exhibit conforms to the original design.

With these innovations, packing, shipping, and assembly have become primary considerations because of cost and facility of erection and dismantling.

Exhibit components come in varying sizes from large to relatively small. Some are free-standing; others have to be supported on tables or the like. It is to these latter structures that the subject matter of the present application is directed.

Because of the changing market which has been referred to previously and because of the necessity of cheap and facile shipping, packaging, and erection requirements, there is provided in the present application panel display components and means for connecting them which meet these needs.

SUMMARY OF THE INVENTION

To accomplish the general objects specified above there is provided in accordance with the present invention a display panel which is formed from a substantially rigid sheet which has a peripheral channel around its outer edge. The peripheral channel is lined with a compressible or frictional material.

In an alternative embodiment this panel may be hinged along one or more dimensions to provide an articulated panel.

Junction between any two of these panels is accomplished by very simple connectors which have specific configuration.

These connectors each have rounded ends which permit penetration of the slots; a length which permits engagement of the slots through their depth; and a thickness which permits them to be grasped by or compress the adjacent slot walls.

These connectors take different specific configurations; however, they all have in common the features mentioned previously.

As will be seen from the drawings and description, the particular embodiments of the panels and connectors may be manufactured from relatively cheap materials and with minimum capital outlay and simplicity of manufacture. It will also be apparent that the embodiments described are illustrative and other alternatives will be apparent to those skilled in the art.

DESCRIPTION OF THE DRAWINGS

FIG. 7 is a schematic section of parts of two adjacent panel sections joined in accordance with the means shown in FIG. 4;

FIG. 8 through 14 are perspective views of alternate connectors in accordance with the present invention which may be employed to effect junctions between panels of the present invention;

DESCRIPTION OF THE PREFERRED EMBODIMENTS

Figure 1:
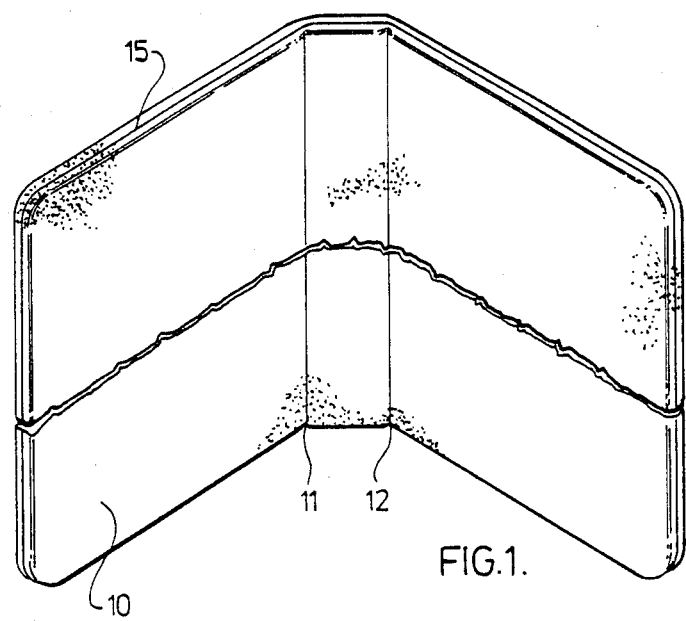
FIG. 1 is a general perspective view of one embodiment of an articulated panel partially broken away in accordance with the present invention.
Figure 2:
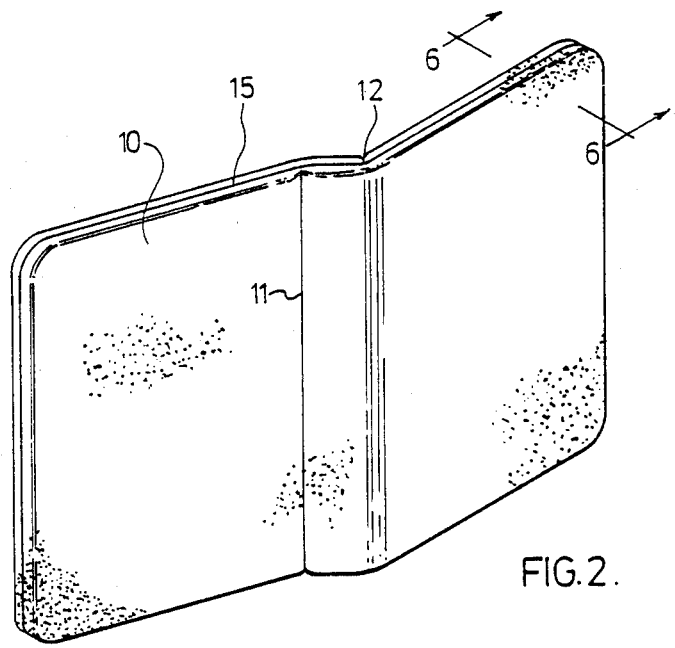
FIG. 2 is a general perspective view of the embodiment of FIG. 1 folded in an alternate direction.
Figure 3:
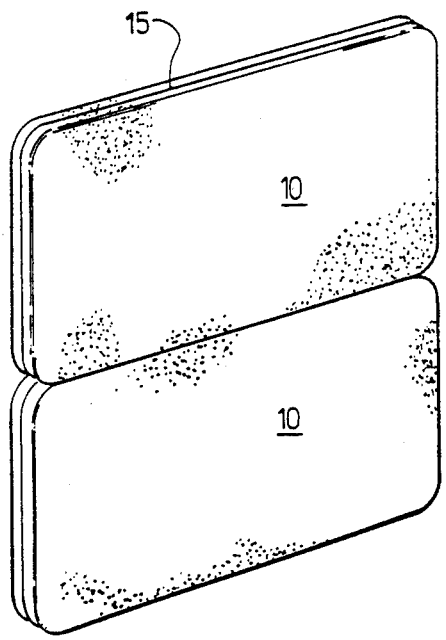
FIG. 3 is a general perspective view of two panels of alternate embodiments of the present invention joined by connectors in accordance with the present invention.
Figure 4:
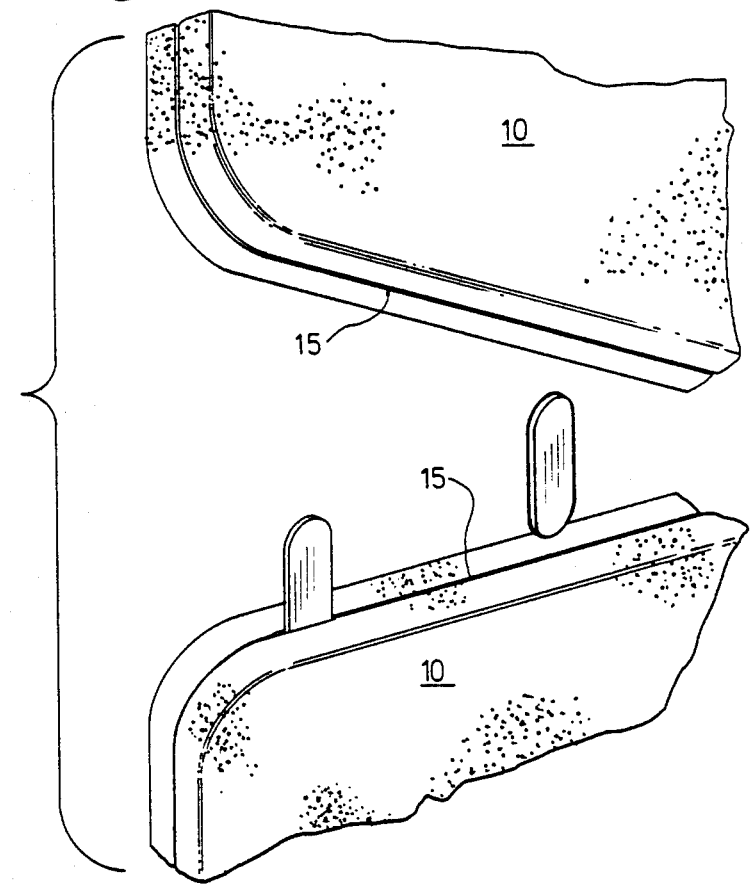
FIG. 4 is a partial exploded view of parts of two adjacent panels in accordance wih the present invention and serves to illustrate the method of joining two panels in accordance with the present invention.

In the structures illustrated in FIGS. 1 and 2 a panel in accordance with the present invention is generally indicated at 10. In these two embodiments the structures are identical to the remaining panels in accordance with the present invention except that these are articulated, as at 11 and 12, by folds which are provided by crushing corrugations at the appropriate positions.

However, it will be noticed that each of the panel structures illustrated through FIGS. 1, 2, 3, 4, 6, 7, 15 and 18 has a peripheral slot or channel 15.

Figure 5:
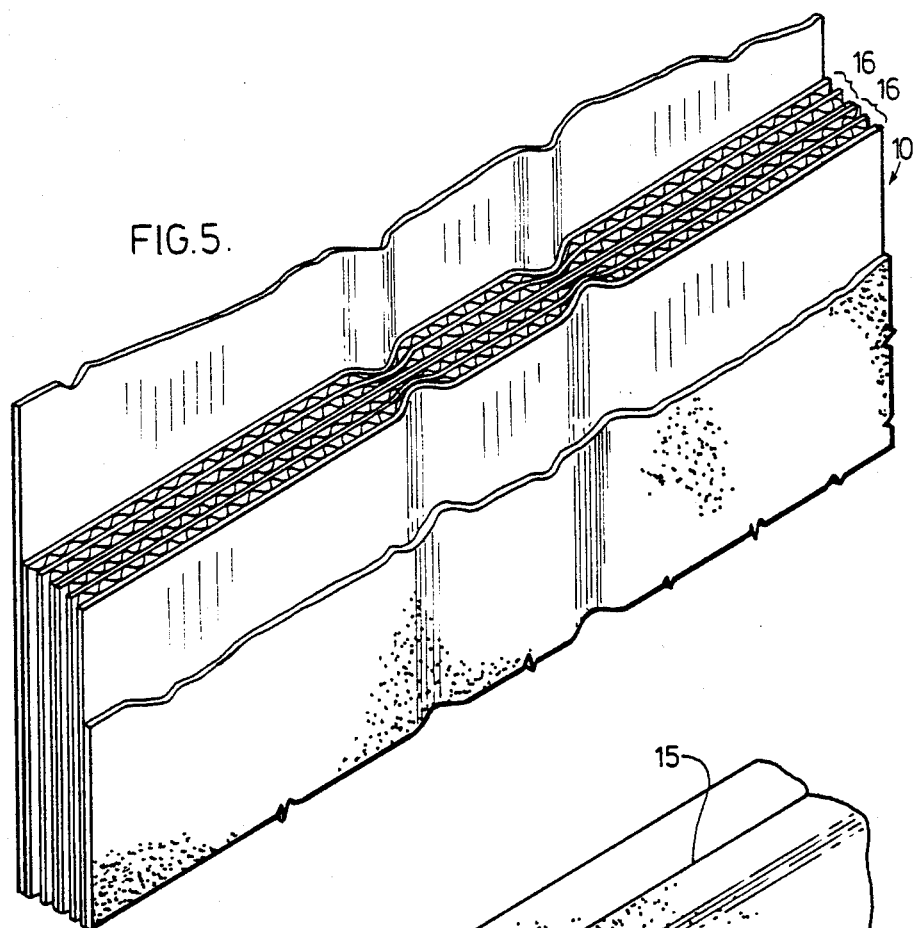
FIG. 5 is a partially fragmented perspective view of one of the panels illustrated in the previous figures and serves to illustrate the interior construction of such panels.

As illustrated in FIG. 5 each panel 10 has a pair of double-ply corrugated sheets 16 over at least one surface of which a compressible cover sheet or fabric 17 is secured. This surface may be conveniently described as the outer surface. One suitable fabric which may be employed is that which is capable of being engaged by Velcro type fasteners.

It will, of course, be understood that as an alternative the panels may be manufactured from a single unitary panel about the periphery of which a channel is provided.

Figure 6:
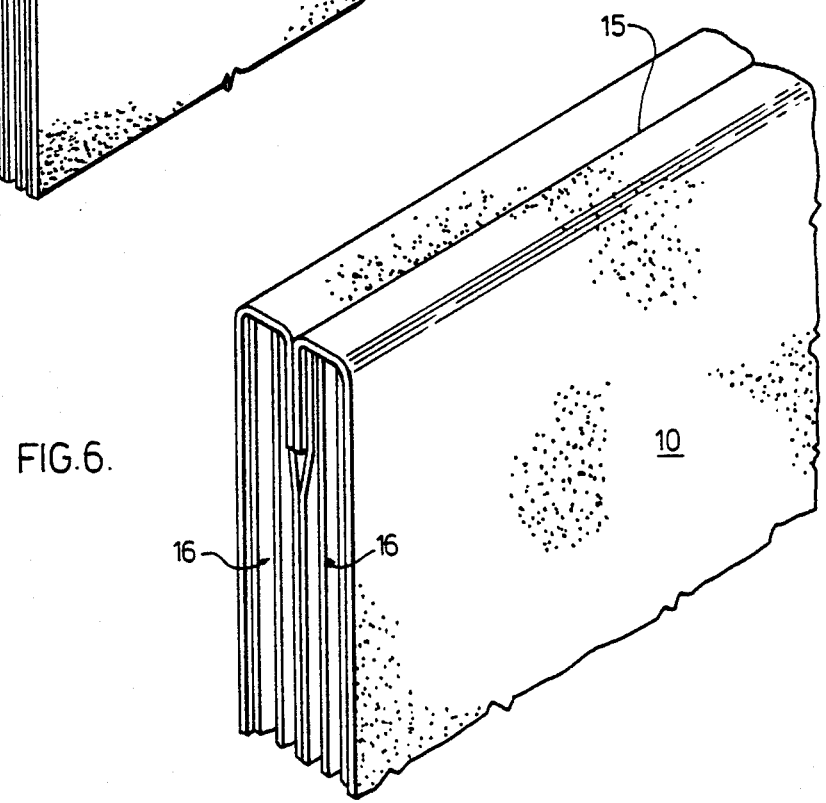
FIG. 6 is a perspective view of a section taken along line 6—6 of FIG. 2.
Figure 15:
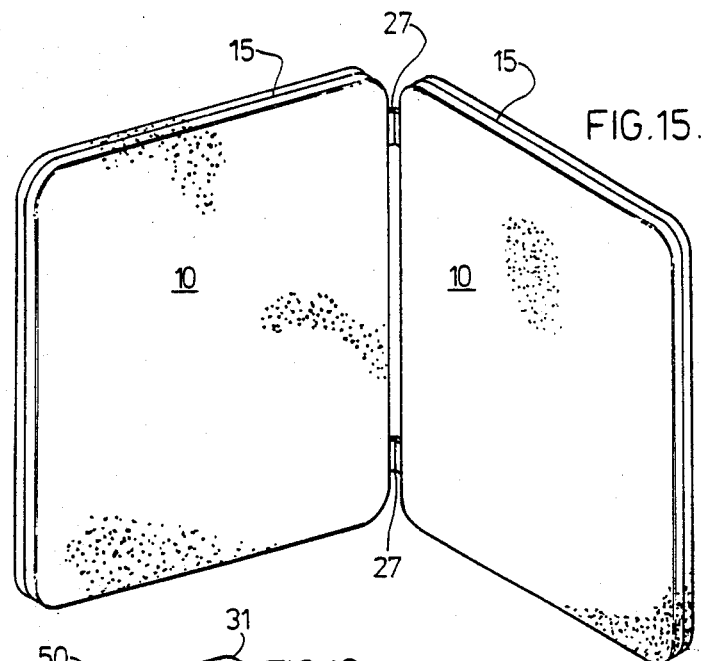
FIG. 15 is a perspective view of a pair of panels in accordance with the present invention joined by alternative connectors in accordance with the present invention.
Figures 16, 17:
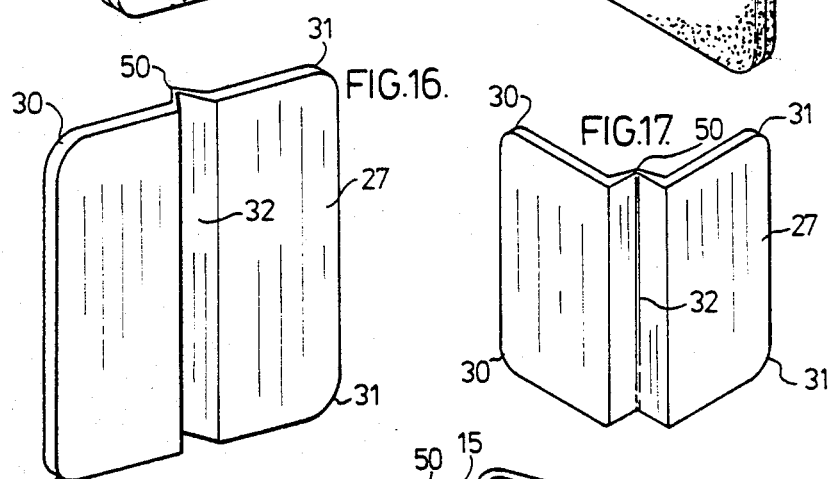
FIGS. 16 and 17 are perspective views of the connectors employed in the structure illustrated in FIG. 15.
Figure 18:
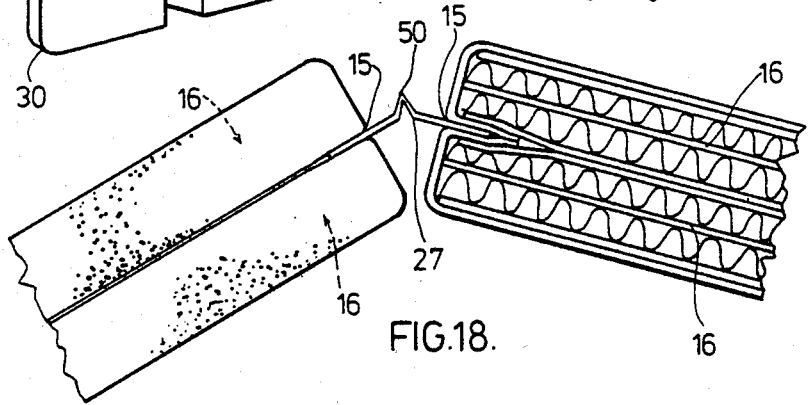
FIG. 18 is a partial sectional plan view of the junction of the structure illustrated in FIG. 15.

The fabric 17 extends over all of the edges of the sheets 16 and into the channel or slot 15 in the manner illustrated in FIGS. 6, 7 and 18.

For facility and economy panels such as 10 are manufactured by selecting or stamping corrugated cardboard panels of the desired configuration, and placing the cover sheet 17 thereover so that the edges overlap the inner surface, that is the surface remote from the outer surface, by a predetermined distance.

The cover sheet 17 is then secured either along the inner surface or to both the inner and outer surfaces of sheets 16 to provide an inner wall portion 40.

Two inner surfaces of sheets 16 are then firmly secured together by preferably an adhesive, but around the periphery an area is left free of adhesive to define slot 15.

Slots 15 are, as has been described, bounded by two opposed layers of fabric. This fabric is preferably compressible. The Velcro-type material previously mentioned has proved suitable, or an alternative material with frictional or compressible characteristics may be employed.

The slot 15 also has a depth in the embodiments illustrated of between ½" and 1½".

With a single panel supporting sheet and a peripheral enamel a resilient slotted channel member may be secured in the peripheral channel of the panel.

In FIGS. 8 through 14, 16 and 17 various alternate embodiments of connectors in accordance with the present invention are illustrated.

In common all of these connectors, which are numbered 20 through 27 respectively, have a thickness such that when inserted in slot 15 they urge the slot from its normally closed position to an open position where contact is made between connector and slot; as in FIGS. 7 and 18.

Each connector is also provided with rounded ends, such as 30 and 31, and an intermediate portion 32 which serves to connect the ends.

The intermediate portion may constitute a bar, a plate or two arms such as illustrated in FIGS. 10, 12, 13 and 14; FIG. 8; and FIGS. 9 and 11, respectively.

With each of these structures the opposite ends 30 and 31 engage adjacent slots 15 of adjacent panels.

Initially one end of each connector is merely pushed into one slot 15 and the remaining free end of the connector is matingly engaged with slot 15 on the panel which is to be joined. This is illustrated in progress in FIG. 4 and is shown in the joined position in section in FIG. 7 where a connector 32 of the form illustrated in FIG. 8 is used.

In the connector 25, illustrated in FIG. 13, a flange 40 which extends laterally is provided on the intermediate section. This flange serves to seat and limit the travel of the connector 25 into channel or slot 15.

When a junction is effected between two panels using these connectors, including connector 25, the connectors are not visible when panels are in the connected stage.

In the embodiments illustrated in FIGS. 15 through 18, the junctions are effected in the same manner as described previously. However, in this embodiment the intermediate portion of connector 27 is hinged as at 50 by the triple fold configuration, or this may be accomplished in any other equivalent manner.

Preferably the connector 27 is of polypropylene or other equivalent materials. The materials of the remaining connectors may be plastic, metal or any other suitable material.

To provide further purchase between the slots and connectors the connector surfaces may be roughened, as illustrated by roughened surface 42 in FIG. 13.

It will be seen from the foregoing description that a display may be erected from the panels and connectors in a very short time without any special tools. The materials are light, economical and the structures are easily fabricated.

It will be obvious that any number of structures may be joined one to the other both vertically and horizontally with equal facility.

It will also be obvious that the dismantling of any displays which employ these panels and connectors may be accomplished as easily as the erection.

While the present invention in relation to the panels and connectors has been described with reference to specific structures, modifications may be made thereto without departing from the invention.

The embodiments of the invention in which an exclusive property or privilege is claimed are defined as follows:

1. A panel for use in display structures which comprises:
   a first sheet member having a plurality of peripheral edges and an outer and inner surface;
   a second sheet member having a plurality of peripheral edges, and an outer and an inner surface;
   a first sheet of facing material mounted on said first sheet member to cover said outer surface and overlap said peripheral edges thereof and said first sheet of facing material being secured to said inner surface to provide a first inner wall portion;
   a second sheet of facing material mounted on said second sheet member to cover said outer surface thereof and overlap said peripheral edges thereof and said second sheet of facing material being secured to said inner surface to provide a second inner wall portion;
   said first and second sheet members being secured to one another with the first and second inner wall portions abutting each other to define a peripheral slot of predetermined depth along at least one of said edges thereof, said slot having contiguous opposed side walls where the first and second inner wall portions abut each other whereby said slot is narrower than the thickness of a connecting member insertable therein and said contiguous opposed side walls adapted to be urged apart and grasp adjacent sufaces of said connecting member when inserted therebetween.

2. A panel as claimed in claim 1 wherein the first and second inner wall portions of said first and second sheets of facing material are compressible at least along said peripheral slot.

3. A panel as claimed in claim 1 wherein said panel is hingedly divided along one dimension to provide an articulated panel member.

* * * * *